US012494608B2

(12) United States Patent
Gundermann et al.

(10) Patent No.: US 12,494,608 B2
(45) Date of Patent: Dec. 9, 2025

(54) POWER HARNESS USING BUSBAR

(71) Applicant: TE Connectivity Solutions GmbH, Schaffhausen (CH)

(72) Inventors: James Edward Gundermann, Lebanon, PA (US); Kevin John Peterson, Kernersville, NC (US); Dinesh Loku Hemnani, Greensboro, NC (US); Adam Price Tyler, Rochester Hills, MI (US); Ashida Pitt, High Point, NC (US)

(73) Assignee: TE Connectivity Solutions GmbH (CH)

( * ) Notice: Subject to any disclaimer, the term of this patent is extended or adjusted under 35 U.S.C. 154(b) by 305 days.

(21) Appl. No.: 18/352,569

(22) Filed: Jul. 14, 2023

(65) Prior Publication Data

US 2024/0030664 A1 Jan. 25, 2024

Related U.S. Application Data

(60) Provisional application No. 63/390,331, filed on Jul. 19, 2022.

(51) Int. Cl.

| | |
|---|---|
| ***H01R 24/28*** | (2011.01) |
| ***H01R 13/04*** | (2006.01) |
| ***H01R 13/506*** | (2006.01) |
| ***H01R 13/52*** | (2006.01) |
| ***H01R 13/621*** | (2006.01) |
| ***H01R 31/06*** | (2006.01) |
| ***H01R 103/00*** | (2006.01) |

(52) U.S. Cl.

CPC ............ *H01R 24/28* (2013.01); *H01R 13/04* (2013.01); *H01R 13/5205* (2013.01); *H01R 13/6215* (2013.01); *H01R 31/06* (2013.01); *H01R 13/506* (2013.01); *H01R 2103/00* (2013.01)

(58) Field of Classification Search

CPC .... H01R 24/28; H01R 13/04; H01R 13/5205; H01R 13/6215; H01R 31/06; H01R 13/506; H01R 2103/00; H01R 13/42; H01R 4/023; H01R 2201/26

See application file for complete search history.

(56) References Cited

U.S. PATENT DOCUMENTS

| | | | | |
|---|---|---|---|---|
| 9,653,843 B2 * | 5/2017 | Suzuki | ................. | H01R 13/506 |
| 10,141,669 B2 * | 11/2018 | Tyler | ...................... | H01R 13/04 |
| 11,336,051 B1 * | 5/2022 | Tyler | .................. | H01R 13/5202 |

* cited by examiner

*Primary Examiner* — Briggitte R. Hammond

(57) ABSTRACT

A power harness includes a plug housing holding a power contact and a busbar received in a chamber of the plug housing. The power contact has a mating portion having a separable mating interface configured to be plugged into a header contact stack of header contacts of the header connector when mated with the header connector. The busbar is welded to a weld pad at a terminating portion of the power contact. A threaded bolt passes through the plug housing configured to be threadably coupled to a threaded connector of the header connector to secure the plug housing to the header connector.

20 Claims, 6 Drawing Sheets

POWER HARNESS USING BUSBAR

CROSS REFERENCE TO RELATED APPLICATIONS

This application claims the benefit of U.S. Provisional Application No. 63/390,331 filed Jul. 19, 2022 titled CONNECTOR FOR SOLID BUSBAR, the subject matter of which is herein incorporated by reference in its entirety.

BACKGROUND OF THE INVENTION

The subject matter herein relates generally to power harnesses.

Electrical connectors are used to electrically connect various components within a system, such as a vehicle. For example, a plug connector may be mated with a header connector. Each connector holds contacts that are mated when the plug connector is coupled to the header connector. The plug connector typically includes power cables terminated to the contacts of the plug connector, which extend from the plug connector to another component. The cable harness is typically heavy and cumbersome to assemble within the vehicle. A need remains for a power harness that eliminates the used of power cables and cable harnesses.

BRIEF DESCRIPTION OF THE INVENTION

In one embodiment, a power harness is provided and includes a plug housing having a chamber extending between a terminating end and a mating end configured to be mated with a header connector of the power harness. The plug housing includes a bore passing through the housing at the mating end. The power harness includes a power contact received in the chamber. The power contact has a mating portion at the mating end of the plug housing. The mating portion includes a separable mating interface configured to be plugged into a header contact stack of header contacts of the header connector when the mating end is mated with the header connector. The power contact has a terminating portion at the terminating end of the plug housing. The terminating portion includes a weld pad. The power harness includes a busbar extending from the chamber at the terminating end. The busbar is welded to the weld pad at the terminating portion of the power contact. The power harness includes a threaded bolt received in the bore and passes through the plug housing. The threaded connector configured to be threadably coupled to a threaded connector of the header connector to secure the plug housing to the header connector.

In another embodiment, a power harness is provided and includes a plug housing having housing walls that define a chamber. The plug housing includes a top and a bottom. The plug housing includes sides that extend between the top and the bottom. The plug housing has a mating end at the bottom configured to be mated with a header connector of the power harness. The plug housing includes a terminating end. The power harness includes a power contact received in the chamber. The power contact has a mating portion at the mating end of the plug housing. The mating portion is planar along a power contact plane. The mating portion includes a separable mating interface configured to be plugged into a header contact stack of header contacts of the header connector when the mating end is mated with the header connector. The power contact has a terminating portion at the terminating end of the plug housing. The terminating portion includes a weld pad. The power harness includes a busbar having an inner portion and an outer portion. The inner portion is located in the chamber and is welded to the weld pad at the terminating portion of the power contact. The outer portion extends from the terminating end of the plug housing. The outer portion extends along a busbar plane. The busbar plane is oriented non-parallel to the power contact plane.

In a further embodiment, a power harness is provided and includes a header connector including a header housing holding header contacts arranged in a header contact stack. Each header contact includes a pair of spring beams flanking a gap at a mating end of the header contact. The gaps of the header contacts are aligned in the header contact stack. The power harness includes a plug connector coupled to the header connector. The plug connector includes a plug housing has a chamber extending between a terminating end and a mating end configured to be mated with the header connector. The plug connector includes a power contact received in the chamber. The power contact has a mating portion at the mating end of the plug housing. The mating portion includes a separable mating interface configured to be plugged into the gaps of the header contacts to mate with the spring beams of each header contact in the header contact stack. The power contact has a terminating portion at the terminating end of the plug housing. The terminating portion includes a weld pad. The plug connector includes a busbar extends from the chamber at the terminating end. The busbar is welded to the weld pad at the terminating portion of the power contact. The plug connector includes a threaded bolt passing through the plug housing and is threadably coupled to the header connector to secure the plug connector to the header connector.

DETAILED DESCRIPTION OF THE INVENTION

Figure 1:
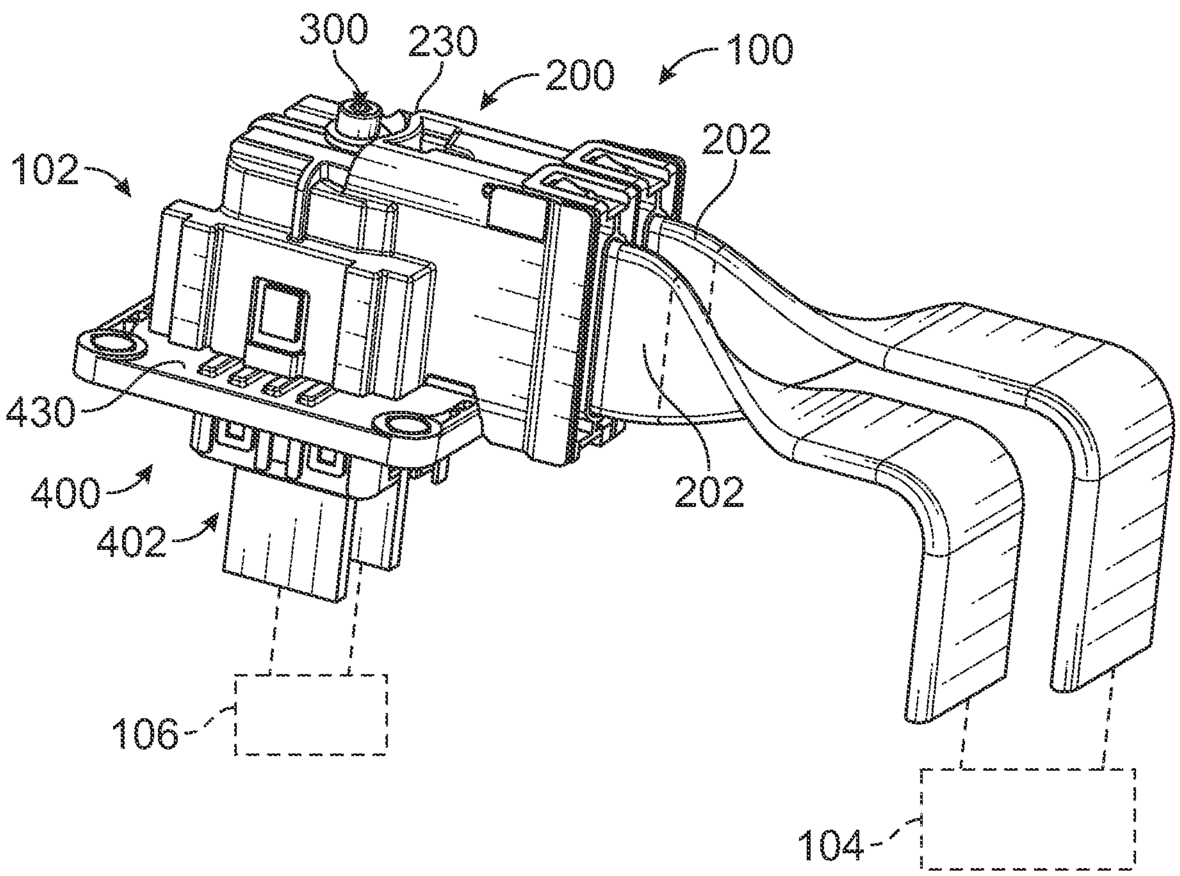
FIG. 1 is a rear perspective view of a power system having a power harness in accordance with an exemplary embodiment.
Figure 2:
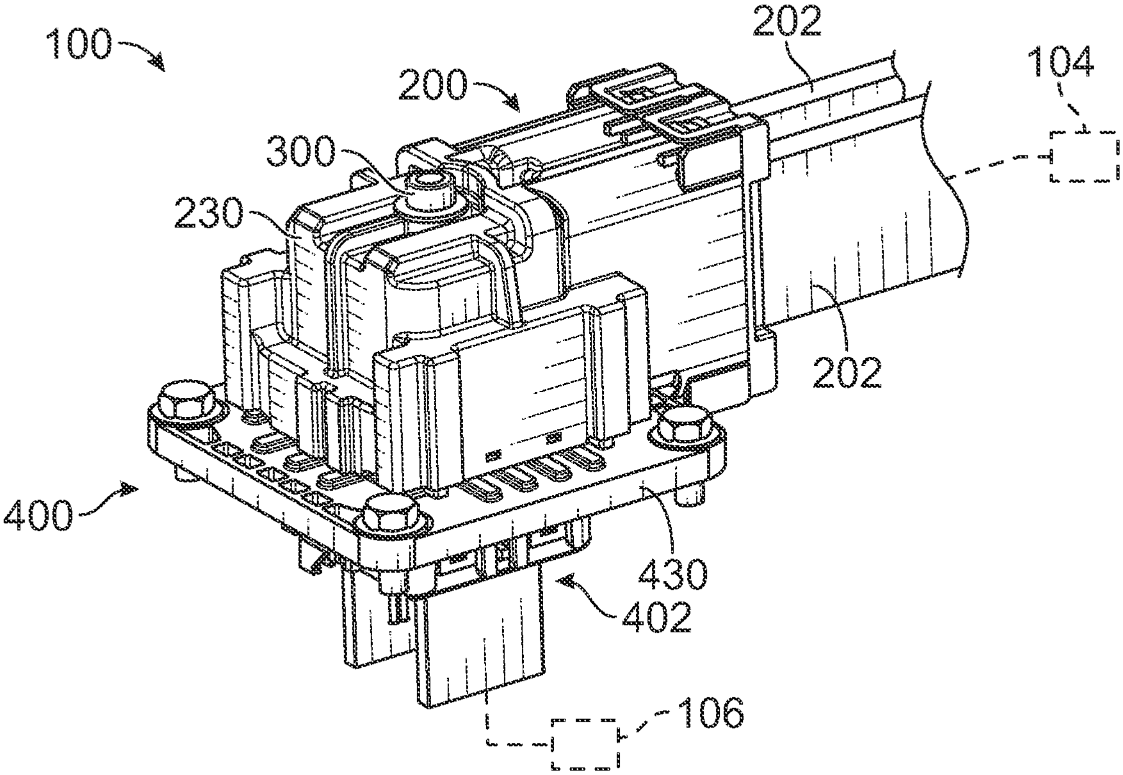
FIG. 2 is a front perspective view of a power system having a power harness in accordance with an exemplary embodiment.

FIG. 1 is a rear perspective view of a power system 100 having a power harness 102 in accordance with an exemplary embodiment. FIG. 2 is a front perspective view of a power system 100 having a power harness 102 in accordance with an exemplary embodiment. The power harness 102 includes power connectors used to electrically connect a first component 104 and a second component 106. For example, the power harness 102 includes a plug connector 200 and a header connector 400. The plug connector 200 is a cable connector provided at an end of one or more flat power cables or busbars 202 (for example, two busbars 202 in the illustrated embodiment). The header connector 400 may additionally or alternatively be provided at an end of a power cable (not shown). In the illustrated embodiment, the header connector 400 is configured to be mounted directly to the electrical component 106. The plug connector 200 is configured to be plugged onto the header connector 400, such as from above, in a mating direction to electrically connect the components 104, 106. The connectors 200, 400 provide a separable interface in a power transmission line between the first and second components 104, 106.

In various embodiments, the power system 100 may be part of a vehicle, such as an electric vehicle. The first component 104 may be a battery of the vehicle and the second component 106 may be a powered device of the vehicle, such as an inverter or motor of the vehicle or a vehicle subsystem, such as a charging inlet, a heater, a compressor, or another vehicle subsystem. The power system 100 may be used in other applications other than electric vehicles in alternative embodiments.

In an exemplary embodiment, the connectors 200, 400 are mechanically connected using threaded components, such as a threaded bolt received in a threaded insert, to connect the connectors 200, 400. In an exemplary embodiment, the connectors 200, 400 are compact or low profile, such as occupying not much more space (for example, height and/or width and/or length) than the corresponding busbar(s) 202. In an exemplary embodiment, the connectors 200, 400 are sealed connectors forming a sealed interface therebetween. The plug connector 200 is sealed to the busbar 202. The header connector 400 is sealed to the component 106. The connectors 200, 400 are sealed to each other using an environmental seal at the mating interface. The threaded fasteners may additionally be sealed within the connectors 200, 400. In an exemplary embodiment, the connectors 200, 400 are touch safe, wherein any and all live conductive elements are insulated to prevent short circuiting, sparking, arcing or injury from touching the live element. The connectors 200, 400 are touch safe both in the mated conditions and the unmated condition. In an exemplary embodiment, the connectors 200, 400 are vibration resistant to maintain a reliable electrical connection along the power transmission line. In an exemplary embodiment, the connectors 200, 400 may be mated at various orientations relative to each other. For example, the busbars 202 may extend away from the connection at different angles, such as 180°, 90° or at other angles. While a single interface is illustrated in FIGS. 1 and 2, the connectors 200, 400 may have multiple interfaces (for example, rather than having a double mating interface, two connectors may be provided each having a single mating interface).

The plug connector 200 includes the busbars 202, a housing 230 receiving the ends of the busbars, power contacts 270 (shown in FIG. 3) connected to the ends of the corresponding busbars 202, and a threaded bolt 300 used to secure the plug connector 200 to the header connector 400. The housing 230 receives the busbars 202, the power contacts 270, and the threaded bolt 300. The housing 230 is configured to be mated with the header connector 400. The threaded bolt 300 is used to mechanically connect the plug connector 200 to the header connector 400. The power contacts 270 are used to electrically connect the busbars 202 to the header connector 400.

The header connector 400 includes contact assemblies 402 and a housing 430 holding the contact assemblies 402. The contact assemblies 402 are configured to be connected to the power contacts 270. The contact assemblies 402 are configured to be electrically connected to the electrical component 106, such as to supply power to the electrical component 106. The housing 430 may hold a threaded insert, such as a threaded socket, to mate with the threaded bolt 300.

Figure 3:
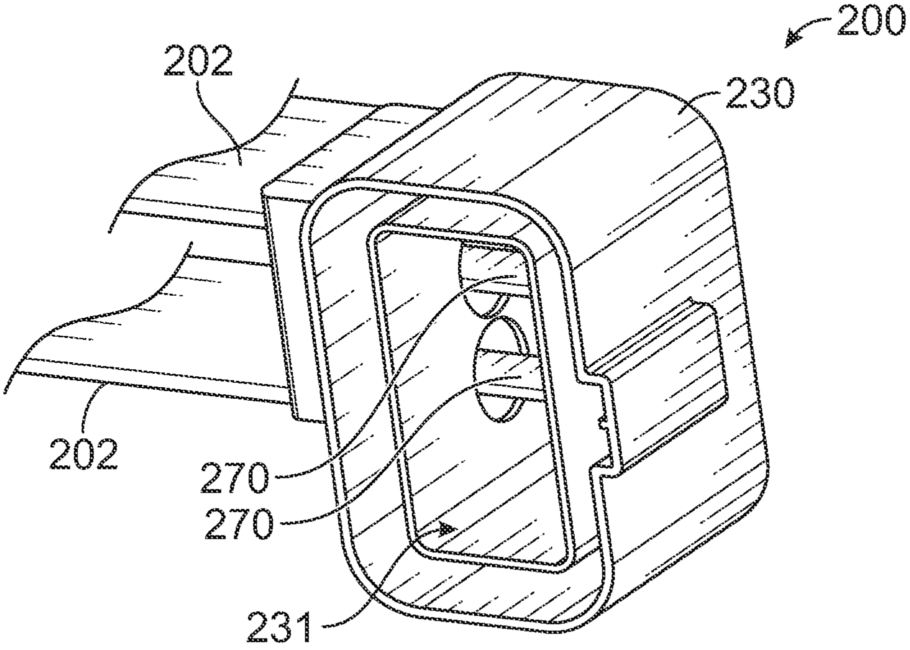
FIG. 3 is a bottom perspective view of a plug connector of the power system in accordance with an exemplary embodiment.

FIG. 3 is a bottom perspective view of the plug connector 200 in accordance with an exemplary embodiment. The plug connector 200 includes the housing 230 holding the busbars 202 and the power contacts 270 connected to the ends of the corresponding busbars 202. The housing 230 includes an opening 231 at the bottom that receives a portion of the header connector 400 (shown in FIG. 4). The power contacts 270 are exposed through the opening 231 for mating with the header connector 400. Optionally, an interface seal (not shown) may be provided at the bottom to interface with the header connector 400. For example, the interface seal may be located in a groove surrounding the opening 231 to interface with the header connector 400.

Figure 4:
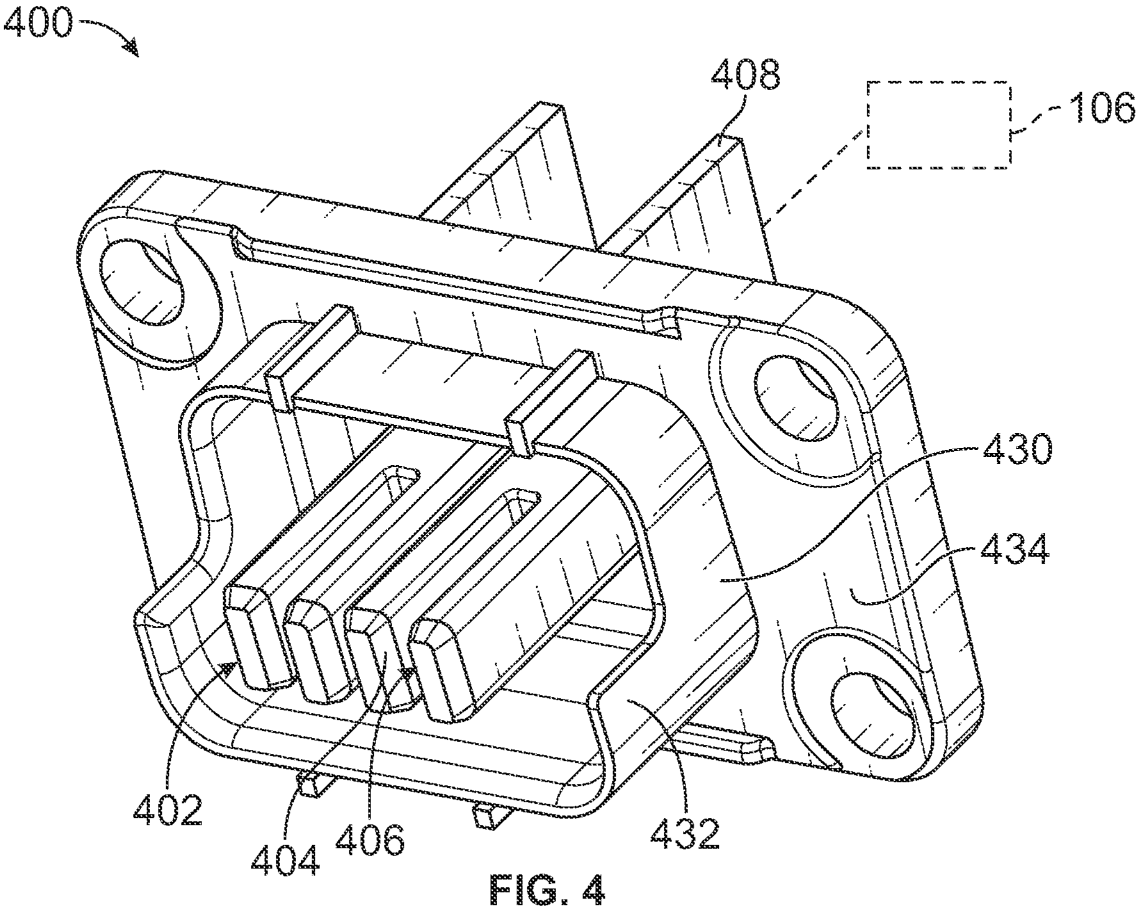
FIG. 4 is a top perspective view of a header connector of the power system in accordance with an exemplary embodiment.

FIG. 4 is a top perspective view of the header connector 400 in accordance with an exemplary embodiment. The header connector 400 includes the header housing 430 holding the contact assemblies 402. The contact assemblies 402 are configured to be electrically connected to the electrical component 106, such as to supply power to the electrical component 106. The header housing 430 may include a shroud 432 extending from a mounting flange 434. The shroud 432 surrounds the contact assemblies 402. The shroud 432 may be plugged into the plug connector 200 (FIG. 3) during mating. The mounting flange 434 is configured to be mounted to a component, such as the second electrical component 106 or a chassis or other part of the vehicle.

Each contact assembly 402 includes header contacts 404 arranged in one or more header contact stacks 406 and a header power contact 408 coupled to the header contact stacks 406. The header contacts 404 electrically connect the header power contact 408 to the power contact 270 (FIG. 3) of the plug connector 200. In an exemplary embodiment, the header contacts 404 are socket contacts having sockets at the end configured to receive the power contact 270. The header contacts 404 may be tuning-fork type contacts having spring beams on opposite sides of the sockets to mate with the power contact 270. Other types of contacts may be used in alternative embodiments.

Figure 5:
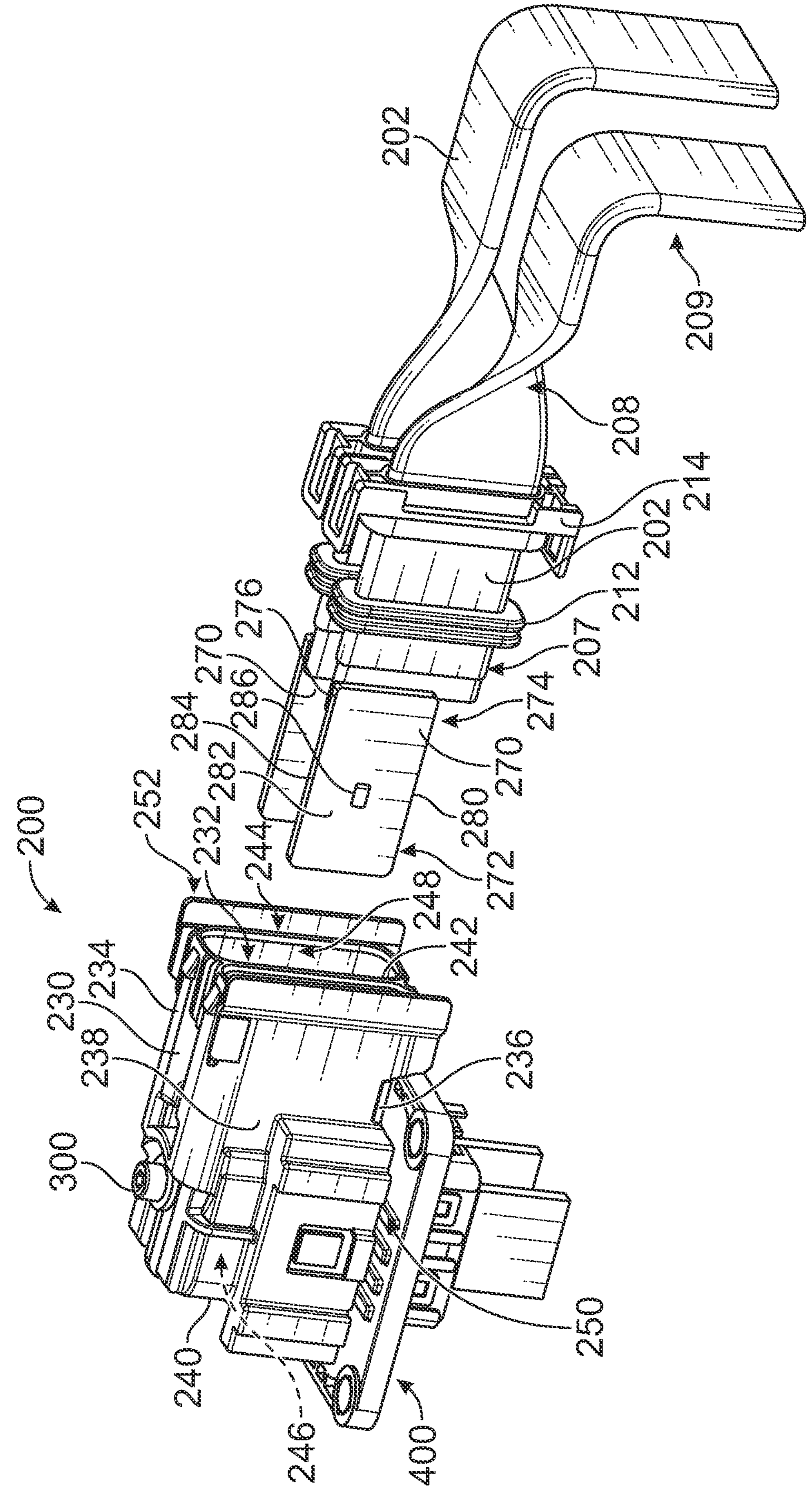
FIG. 5 is an exploded view of the plug connector in accordance with an exemplary embodiment.

FIG. 5 is an exploded view of the plug connector 200 in accordance with an exemplary embodiment shown mated to the header connector 400. The plug connector 200 includes the busbars 202, the housing 230, the power contacts 270, and the threaded bolt 300. In an exemplary embodiment, the power contacts 270 are welded to the busbars 202.

In an exemplary embodiment, the busbar 202 is a flat metal busbar. The busbar 202 may be a jacketed busbar such that the busbar 202 is touchsafe. The busbar 202 may be a solid core busbar, such as an extruded metal busbar. Alternatively, the busbar 202 may be a stranded or braided flat cable. In an exemplary embodiment, a busbar seal 212 is provided surrounding the busbar 202. The busbar seal 212 may be sealed to the busbar jacket. The busbar seal 212 is configured to be sealed against the housing 230. The busbar seal 212 may be a rubber material in various embodiments.

Optionally, multiple busbar seals 212 may be used to seal to the various components. In an exemplary embodiment, a busbar ferrule 214 is provided to secure the busbar 202 to the housing 230. The busbar ferrule 214 may be secured to the housing 230 by a latch, clip, fastener or other securing element. The busbar ferrule 214 may retain the busbar seal 212 in the housing 230.

The housing 230 is manufactured from a dielectric material, such as a plastic material. Optionally, the housing 230 may be an injection molded part. In various embodiments, the housing 230 is a multi-piece housing. For example, the housing 230 may include an outer shell and a housing insert received in the outer shell. Alternatively, the housing 230 may be a single piece housing.

The housing 230 includes walls forming a chamber 232 that receives the busbars 202, the power contacts 270, and the threaded bolt 300. In an exemplary embodiment, the housing 230 includes a top 234 and a bottom 236. The housing 230 includes sides 238 extending between a front 240 and a rear 242. The housing 230 includes an opening 244 at the rear 242 providing access to the chamber 232. The busbars 202 are received in the opening 244. The busbar ferrule 214 may be plugged into the opening 244 and coupled to the housing 230 at the rear 242. The busbar seal 212 may be sealed to the interior surface of the housing 230 at the opening 244. In an exemplary embodiment, the bottom 236 defines a mating end 250 of the housing 230 and the rear 242 defines a terminating end 252 of the housing 230. Other orientations are possible in alternative embodiments. The mating end 250 is configured to be mated to the header connector 400.

In an exemplary embodiment, the housing 230 includes a contact channel 246 in the chamber 232 that receives the power contact 270. The contact channel 246 is aligned with the opening 244 to receive the power contact 270 with the busbar 202 from the opening 244. The contact channel 246 receives the power contact 270 in a rear-to-front loading direction as the power contact 270 is loaded into the housing 230 from the rear 242. In the illustrated embodiment, the contact channel 246 is located at the front 240.

In an exemplary embodiment, the housing 230 includes a busbar channel 248 in the chamber 232 that receives the busbar 202. The busbar channel 248 is aligned with the opening 244 to receive the busbar 202 from the opening 244. The busbar channel 248 receives the busbar 202 in a rear-to-front loading direction as the busbar 202 is loaded into the housing 230 from the rear 242. In the illustrated embodiment, the busbar channel 248 is located at the rear 242. The busbar channel 248 may be larger than the contact channel 246 because the busbar 202 may be larger than the power contact 270.

The power contact 270 is a metal conductor, such as an aluminum or copper conductor. The power contact 270 may be an extruded metal contact in various embodiments. Alternatively, the power contact 270 may be hot forged or stamped and formed. The power contact 270 may be plated or coated in various embodiments. The power contact 270 extends between a terminating end 272 and a mating end 274. The mating end 274 is configured to be mated with the corresponding power contact of the header connector 400. The terminating end 272 is configured to be terminated to the busbar 202. The power contact 270 includes a weld pad 276 at the terminating end 272. The busbar 202 is welded to the weld pad 276 at the terminating end 272. Other types of terminations may be used in alternative embodiments.

In the illustrated embodiment, the power contact 270 is rectangular. However, the power contact 270 may have other shapes in alternative embodiments. The power contact 270 includes a mating edge 280 at the mating end 274. The mating edge 280 may be the bottom edge in various embodiments. The power contact includes a first surface 282 and a second surface 284 opposite the first surface 282. The mating edge 280 extends between the first and second surfaces 282, 284. The mating edge 280 is configured to be plugged into the mating contact of the header connector 400 to electrically connect the power contact 270 to the mating contact of the header connector 400. The first and second surfaces 282, 284 define mating surfaces configured to be electrically connected to the mating contact of the header connector 400.

In an exemplary embodiment, the power contact 270 includes a tab 286 extending from the first surface 282 and/or the second surface 284. The tab 286 is used to secure the power contact 270 in the housing 230, such as in the contact channel 246. The tab 286 may be deflectable.

Figure 6:
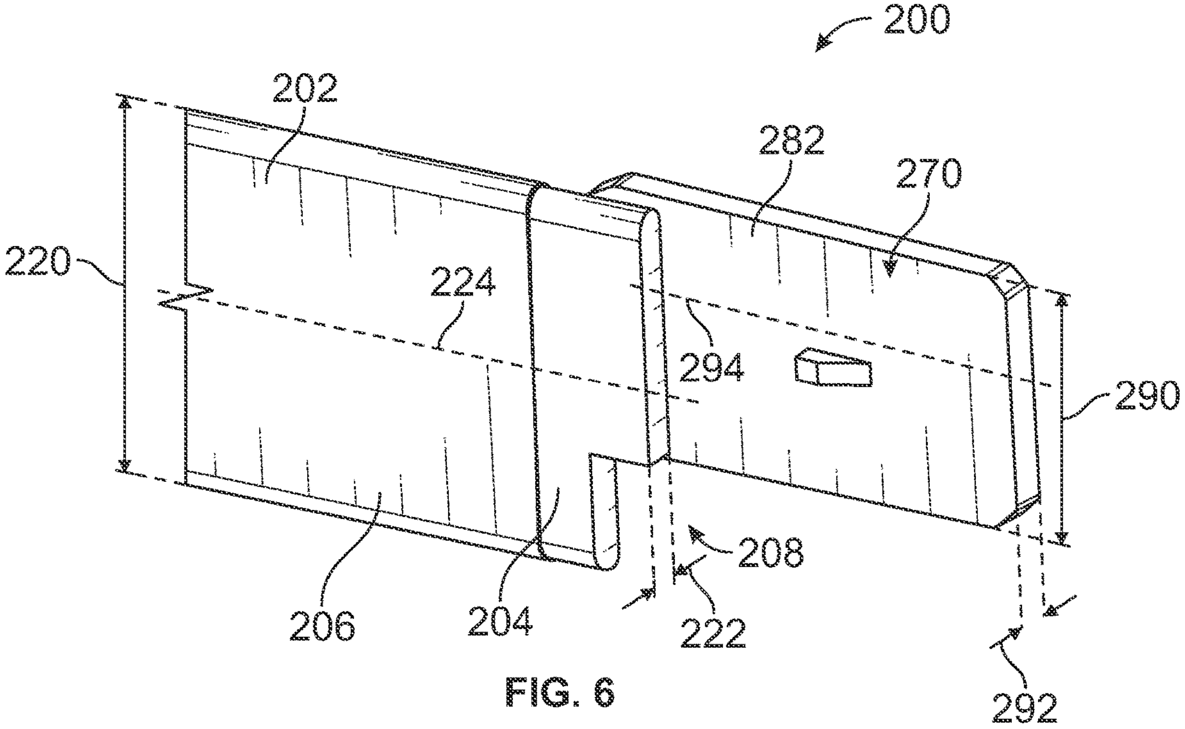
FIG. 6 illustrates a portion of the plug connector showing the busbar coupled to the power contact in accordance with an exemplary embodiment.

FIG. 6 illustrates a portion of the plug connector 200 showing the busbar 202 coupled to the power contact 270 in accordance with an exemplary embodiment. The busbar 202 includes a conductor 204 and a jacket 206 surrounding the conductor 204. The conductor 204 may be an aluminum conductor rather than a copper conductor to reduce weight and cost. The conductor 204 may be a flat conductor (for example, being wide and thin). The conductor 204 may be generally rectangular. Optionally, the conductor 204 may have rounded edges. A portion of the jacket 206 is removed at the end to expose the conductor 204. The exposed portion of the busbar 202 is welded to the power contact 270. A portion of the power contact 270 overlaps the busbar 202 and is welded to the busbar 202, such as to the first surface 282. The busbar 202 may be formed into a particular shape (such as to extend between the header connector and the first electrical component) and may retain shape when formed. As such, the busbar 202 may be made relatively short (for example, without wasted length) between the header connector and the first electrical component. The conductor may be used to dissipate heat away from the plug connector 200 and the header connector 400.

In an exemplary embodiment, the busbar 202 includes a notch 208 at the bottom of the busbar 202. The notch 208 shortens the busbar 202, such as to a height that is generally equal to the height of the power contact 270. For example, the busbar 202 has a height 220 and a thickness 222. The notch 208 reduces the height 220 at the end. In the illustrated embodiment, the notch 208 reduces the height by approximately 25%. The power contact 270 has a height 290 and a thickness 292. The power contact 270 has a power contact centerline 294 centered along the height 290 between the top and the bottom of the power contact 270. The busbar 202 has a busbar centerline 224 centered along the height 220 between the top and the bottom of the busbar 202. In an exemplary embodiment, the busbar centerline 224 is offset from the power contact centerline 294. For example, the busbar centerline 224 is shifted downward relative to the power contact centerline 294. The busbar 202 is shifted downward relative to the power contact 270 to reduce the profile (for example, overall height) of the assembly and thus the plug connector 200.

Figure 7:
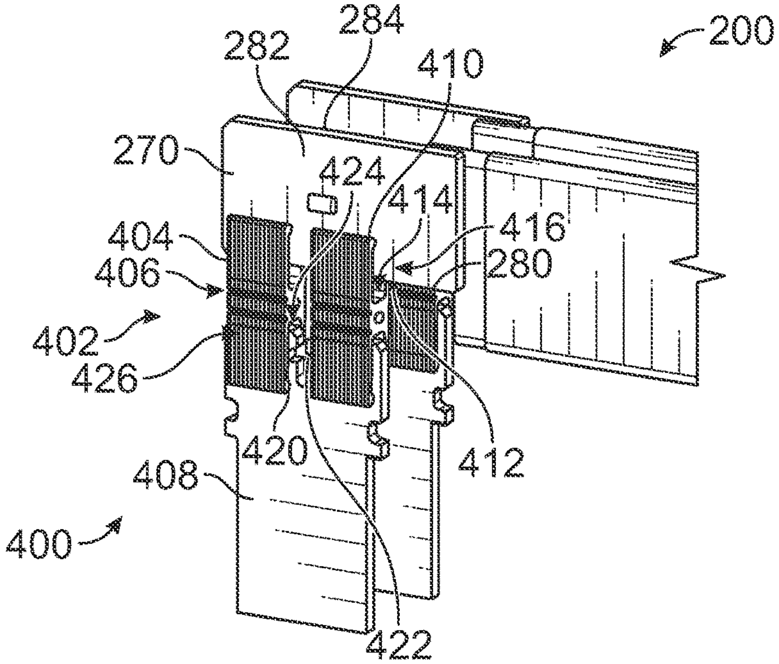
FIG. 7 illustrates the power contacts of the plug connector coupled to the contact assemblies of the header connector in accordance with an exemplary embodiment.

FIG. 7 illustrates the power contacts 270 of the plug connector 200 coupled to the contact assemblies 402 of the header connector 400. Each contact assembly 402 includes the header contacts 404 arranged in the header contact stacks 406 and the header power contact 408 coupled to the header contact stacks 406. The header contacts 404 electrically connect the header power contact 408 to the power contact 270 of the plug connector 200.

In the illustrated embodiment, the header contacts 404 are dual socket contacts having sockets at both ends of the header contacts 404. Other types of contacts may be used in alternative embodiments. Each header contact 404 includes spring beams 410, 412 on opposite sides of a gap 414 at a first mating end 416 of the header contact 404. The gap 414 defines a socket configured to receive the bottom edge 280 of the power contact 270. For example, the power contact 270 is plugged into the gap 414 from above in a mating direction when the plug connector 200 is mated to the header connector 200. The spring beams 410, 412 engage the first and second surfaces 282, 284 of the power contact 270 to electrically connect the header contact 404 to the power contact 270. Each header contact 404 includes spring beams 420, 422 on opposite sides of a gap 424 and a second mating end 426 of the header contact 404. The gap 424 defines a socket configured to receive the top edge of the header power contact 408. The spring beams 420, 420 to engage the side surfaces of the header power contact 408 to electrically connect the header contact 404 to the header power contact 408. The header contacts 404 are arranged in the header contact stack 406 such that the gaps 414, 424 are aligned with each other to receive the power contact 270 and the header power contact 408. The header contacts 404 may be independently movable within the header contact stack 406 to interface with the power contacts 270 and/or the header power contact 408.

Figure 8:
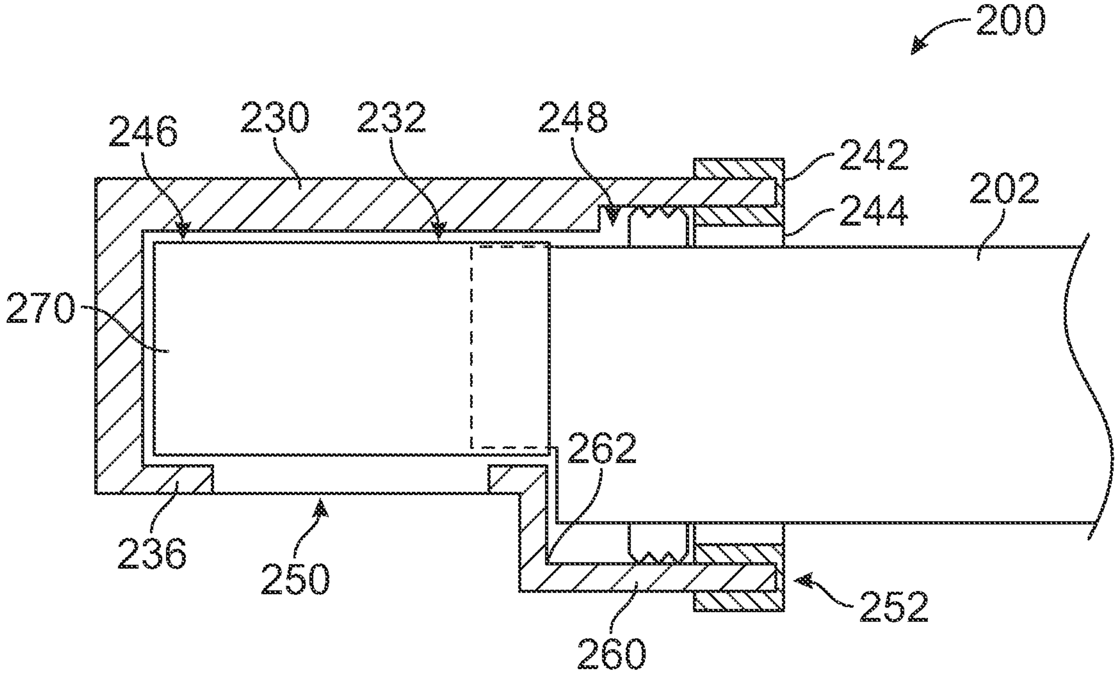
FIG. 8 is a cross sectional view of the plug connector in accordance with an exemplary embodiment.

FIG. 8 is a cross sectional view of the plug connector 200 in accordance with an exemplary embodiment. The power contact 270 and the busbar 202 are arranged in the chamber 232. For example, the power contact 270 is located in the power contact channel 246 and the busbar 202 is located in the busbar channel 248. The busbar 202 extends rearward from the housing 230. For example, the busbar 202 exits the housing 230 through the opening 244 at the rear 242.

The channels 246, 248 are defined by walls 260 of the housing 230. In an exemplary embodiment, the walls 260 of the housing 230 include a step 262 between the power contact channel 246 and the busbar channel 248. The step 262 positions the bottom of the power contact channel 246 at a vertical height above the position of the busbar channel 248. A portion of the busbar channel 248 is located below the power contact channel 246, which allows the busbar 202 to be positioned at a lower vertical height to reduce the overall height or profile of the system. For example, the bottom 236 of the housing 230 at the terminating end 252 may be located below the bottom 236 of the housing 230 at the mating end 250. For example, the opening 244 at the bottom 236, which receives a portion of the header connector 400, may be located above the bottom 236 of the housing 230 at the rear 242. By shifting the terminating end 252 downward, the overall profile of the plug housing 230 may be reduced (for example, compared to the top of the chassis on which the header connector 400 is mounted).

With reference back to FIG. 5, during assembly, the power contact 270 and the busbar 202 are loaded into the chamber 232 through the rear 242. The power contact 270 is located in the power contact channel 246 at the mating end 250 of the housing 230 and the busbar 202 is located in the busbar channel 248 at the terminating end 252 of the housing 230. In an exemplary embodiment, the power contact 270 is oriented vertically (for example, parallel to the mating direction) such that the mating edge 280 may be plugged into the header contacts 404 (FIG. 4) from above during mating of the plug connector 200 with the header connector

400. For example, the power contact 270 extends along a power contact plane, which is a vertical plane.

In the illustrated embodiment, a terminating portion 207 of the busbar 202 (for example, initial length of the busbar 202 from the end terminated to the power contact 270) is oriented vertically. The terminating portion 207 of the busbar exits the housing 230 in the vertical orientation. In an exemplary embodiment, the busbar 202 further includes a twisted portion 208 downstream of the terminating portion 207. The busbar 202 is twisted through the twisted portion 208 to orient a downstream portion 209 of the busbar 202 nonparallel to the power contact 270. In the illustrated embodiment, the busbar 202 is twisted 90° through the twisted portion 208 such that the downstream portion 209 is oriented perpendicular to the terminating portion 207. However, the busbar 202 may be twisted greater or less than 90° in alternative embodiments. The busbar 202 (along the downstream portion 209) extends along a busbar plane, which is a horizontal plane. The twisted portion 208 helps reduce the effects of vibration of the busbar 202 at the mating interface with the header contacts 404. For example, the effects of vibration of the busbar 202 are greatest in the same direction as the stiffest direction of the busbar 202. The vibration of the busbar 202 is thus greatest side-to-side due to the width of the busbar 202 along the downstream portion 209 being in a side-to-side direction rather than a top-to-bottom direction. The vibration of the busbar 202 is thus perpendicular to the mating direction with the header contacts 404, which reduces wear or sliding between the header contacts and the power contact 270.

Figure 9:
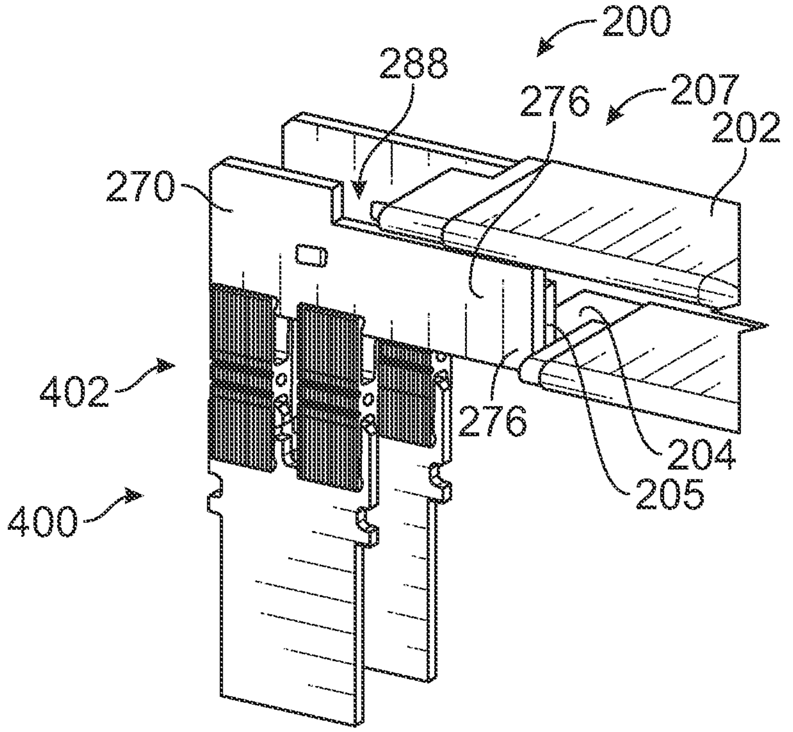
FIG. 9 illustrates the power contacts of the plug connector coupled to the contact assemblies of the header connector in accordance with an exemplary embodiment.

FIG. 9 illustrates the power contacts 270 of the plug connector 200 coupled to the contact assemblies 402 of the header connector 400. The busbars 202 have a different orientation in the embodiment shown in FIG. 9 compared to the embodiment shown in FIG. 7. For example, the terminating portions 207 of the busbars 202 are oriented horizontally, which is perpendicular to the vertical orientation of the power contacts 270. The busbars 202 include weld tabs 205 at the ends of the conductors 204. The weld tabs 205 are configured to be welded to the weld pads 276 of the power contacts 270. The power contacts 270 include notches 288, which reduce the overall height of the power contacts 270, but which accommodate the busbars 202 (for example, to allow a reduced overall profile or height of the plug connector 200).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. A power harness comprising:

a plug housing having a chamber extending between a terminating end and a mating end configured to be mated with a header connector of the power harness, the plug housing including a bore passing through the housing at the mating end;

a power contact received in the chamber, the power contact having a mating portion at the mating end of the plug housing, the mating portion including a separable mating interface configured to be plugged into a header contact stack of header contacts of the header connector when the mating end is mated with the header connector, the power contact having a terminating portion at the terminating end of the plug housing, the terminating portion including a weld pad;

a busbar extending from the chamber at the terminating end, the busbar being welded to the weld pad at the terminating portion of the power contact; and a threaded bolt received in the bore and passing through the plug housing, the threaded connector configured to be threadably coupled to a threaded bolt of the header connector to secure the plug housing to the header connector.

2. The power harness of claim 1, wherein the busbar includes a twisted portion to orient the busbar nonparallel to the power contact.

3. The power harness of claim 1, wherein the power contact is planar extending along the power contact plane, the busbar including an inner portion and an outer portion, the inner portion located in the chamber and being welded to the weld pad at the terminating portion of the power contact, the outer portion extending from the terminating end of the plug housing, the outer portion extending along a busbar plane, the busbar plane being oriented nonparallel to the power contact plane.

4. The power harness of claim 1, wherein the busbar includes a busbar seal sealingly coupled between the busbar and the plug housing.

5. The power harness of claim 1, wherein the busbar includes a busbar ferrule coupled to the busbar, the busbar ferrule removably coupled to the plug housing to secure the busbar to the plug housing.

6. The power harness of claim 1, wherein the power contact extends along a power contact center line, the busbar including a busbar center line offset relative to the power contact center line.

7. The power harness of claim 1, wherein the busbar includes a notch offset below the power contact.

8. The power harness of claim 1, wherein the chamber includes a power contact channel receiving the power contact and a busbar channel receiving the busbar, the plug housing including a step between the power contact channel and the busbar channel such that a portion of the busbar channel is located below the power contact channel.

9. The power harness of claim 1, wherein the power housing includes a top and the bottom, the power housing including an opening at the bottom configured to receive a portion of the header connector through the opening, the plug housing, at the terminating end, located below the opening.

10. The power harness of claim 1, wherein the threaded bolt includes a bolt seal configured to be sealed between the threaded bolt and the plug housing.

11. The power harness of claim 1, wherein the busbar is a flat cable having a width at least ten times a thickness of the flat cable.

12. A power harness comprising:

a plug housing having housing walls defining a chamber, the plug housing includes a top and a bottom, the plug housing includes sides extending between the top and the bottom, the plug housing having a mating end at the bottom configured to be mated with a header connector of the power harness, the plug housing including a terminating end;

a power contact received in the chamber, the power contact having a mating portion at the mating end of the plug housing, the mating portion being planar along a power contact plane, the mating portion including a separable mating interface configured to be plugged into a header contact stack of header contacts of the header connector when the mating end is mated with the header connector, the power contact having a terminating portion at the terminating end of the plug housing, the terminating portion including a weld pad;

a busbar having an inner portion and an outer portion, the inner portion located in the chamber and being welded to the weld pad at the terminating portion of the power contact, the outer portion extending from the terminating end of the plug housing, the outer portion extending along a busbar plane, the busbar plane being oriented non-parallel to the power contact plane.

13. The power harness of claim 12, further comprising a threaded bolt passing through the plug housing, the threaded connector configured to be threadably coupled to a threaded connector of the header connector to secure the plug housing to the header connector.

14. The power harness of claim 12, wherein the busbar includes a twisted portion to orient the busbar nonparallel to the power contact.

15. The power harness of claim 12, wherein the plug housing has a busbar exit at the terminating end, the busbar being oriented parallel to the power contact plane at the busbar exit, the busbar being twisted downstream of the busbar exit to orient the busbar plane nonparallel to the power contact plane.

16. The power harness of claim 12, wherein the busbar includes a busbar seal sealingly coupled between the busbar and the plug housing.

17. A power harness comprising:

a header connector including a header housing holding header contacts arranged in a header contact stack, each header contact including a pair of spring beams flanking a gap at a mating end of the header contact, the gaps of the header contacts being aligned in the header contact stack; and a plug connector coupled to the header connector, the plug connector includes a plug housing having a chamber extending between a terminating end and a mating end configured to be mated with the header connector, the plug connector includes a power contact received in the chamber, the power contact having a mating portion at the mating end of the plug housing, the mating portion including a separable mating interface configured to be plugged into the gaps of the header contacts to mate with the spring beams of each header contact in the header contact stack, the power contact having a terminating portion at the terminating end of the plug housing, the terminating portion including a weld pad, the plug connector includes a busbar extending from the chamber at the terminating end, the busbar being welded to the weld pad at the terminating portion of the power contact, the plug connector includes a threaded bolt passing through the plug housing and being threadably coupled to the header connector to secure the plug connector to the header connector.

18. The power harness of claim 17, wherein the header housing includes a mounting flange configured to be mounted to an electrical component, the mounting flange having an upper surface and a lower surface facing the electrical component, the plug connector coupled to the header connector from above the upper surface, the plug housing at the terminating end extending along the sides of the mounting flange to an elevation below the upper surface.

19. The power harness of claim 17, wherein the busbar includes a twisted portion to orient the busbar nonparallel to the power contact.

20. The power harness of claim 17, wherein the busbar includes a notch offset below the power contact.

* * * * *